United States Patent

Narai et al.

[11] Patent Number: 5,893,812
[45] Date of Patent: Apr. 13, 1999

[54] DRIVING FORCE DISTRIBUTING SYSTEM FOR VEHICLE

[75] Inventors: Katsuyuki Narai; Katsuhiro Kitamura; Kazuyoshi Kuwahara; Kenji Honda; Tetsushi Asano; Yasuji Shibahata; Kazuhiro Wada; Koji Yokomizo, all of Wako, Japan

[73] Assignee: Honda Giken Kogyo Kabushiki Kaisha, Tokyo, Japan

[21] Appl. No.: 08/857,562

[22] Filed: May 16, 1997

[30] Foreign Application Priority Data

May 21, 1996 [JP] Japan ................. 8-126140
May 21, 1996 [JP] Japan ................. 8-126144

[51] Int. Cl.⁶ ........................................ B60K 17/00
[52] U.S. Cl. ...................... 475/86; 475/204; 475/206
[58] Field of Search ............................ 475/86, 84, 199, 475/200, 206, 204, 88, 160

[56] References Cited

U.S. PATENT DOCUMENTS

| | | | |
|---|---|---|---|
| 4,730,514 | 3/1988 | Shikata et al. | 475/88 |
| 5,098,351 | 3/1992 | Kobayashi | 475/86 |
| 5,161,636 | 11/1992 | Haupt et al. | 475/86 X |
| 5,188,574 | 2/1993 | Echigo et al. | 475/200 X |
| 5,209,321 | 5/1993 | Sado | 475/160 X |
| 5,310,388 | 5/1994 | Okcuoglu et al. | 475/88 |
| 5,370,588 | 12/1994 | Sawase et al. | 475/199 X |
| 5,437,583 | 8/1995 | Shibahata et al. | 475/84 X |
| 5,692,987 | 12/1997 | Shibahata et al. | 475/206 X |
| 5,735,764 | 4/1998 | Shaffer et al. | 475/88 |

FOREIGN PATENT DOCUMENTS 0074343  3/1989  Japan .................. 475/88

Primary Examiner—Dirk Wright
Assistant Examiner—Peter T. Kwon
Attorney, Agent, or Firm—Nikaido Marmelstein Murray & Oram, LLP

[57] ABSTRACT

A driving force distributing device is provided for distributing a driving force of an engine to the left and right wheels of a vehicle by bringing a pair of hydraulic clutches into and out of their engaged states. The distributing device includes a hydraulic pump mounted within a casing thereof and driven through gears by a half shaft connected to one of the wheels. An oil passage interconnects the hydraulic pump and the hydraulic clutches, the oil passage being defined in a casing. A valve block is coupled to an upper surface of the casing. Thus, the oil passages interconnecting the hydraulic pump and the hydraulic clutches of the driving force distributing device can be compactly formed.

14 Claims, 9 Drawing Sheets

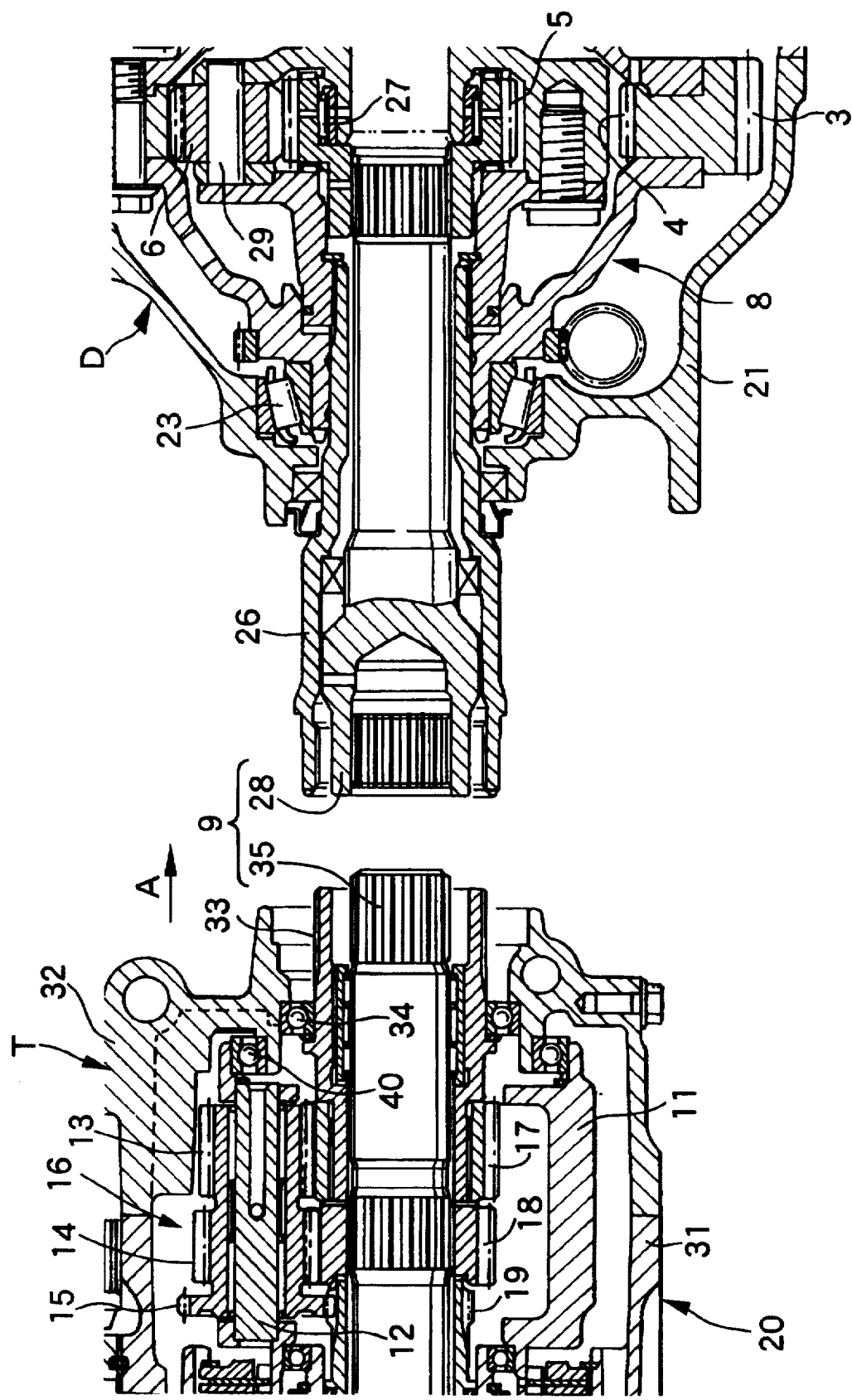

DRIVING FORCE DISTRIBUTING SYSTEM FOR VEHICLE

BACKGROUND OF THE INVENTION

1. Field of the Invention

The present invention relates to a driving force distributing system for a vehicle including a driving force distributing device for distributing a driving force of an engine to left and right wheels by controlling the engaged state of a hydraulic clutch, and a hydraulic pump for producing hydraulic pressure in the hydraulic clutch.

2. Description of the Prior Art

In general, a driving force distributing device for distributing a driving force to left and right front wheels in a front engine and front drive vehicle is provided in the vicinity of the transmission. Therefore, the hydraulic pressure for operating the hydraulic clutch of the driving force distributing device is supplied from the hydraulic pump of the transmission.

However, the driving force distributing system suffers from a problem that if an attempt is made to supply hydraulic pressure from the hydraulic pump in the transmission to the hydraulic clutch of the driving force distributing device, it is necessary to connect the transmission and the driving force distributing device to each other by a pipe extending through the outside of a casing, and the entire length of the oil passage through the pipe is increased.

SUMMARY OF THE INVENTION

Accordingly, it is an object of the present invention to compactly form the oil passage, which connects the hydraulic pump to the hydraulic clutch of the driving force distributing device.

To achieve the above object, according to a first aspect and feature of the present invention, there is provided a driving force distributing system for a vehicle including a driving force distributing device for distributing the driving force of an engine to left and right wheels by controlling the engaged state of a hydraulic clutch, and a hydraulic pump for producing hydraulic pressure in the hydraulic clutch, wherein the hydraulic pump is disposed within a casing of the driving force distributing device and driven by a rotary shaft connected to one of the left and right wheels.

With the above arrangement, it is possible not only to minimize the length of an oil passage extending from the hydraulic pump to the hydraulic clutch, but also to simplify the driving system for driving the hydraulic pump.

According to a second aspect and feature of the present invention, the driving force distributing device comprises a carrier member supported for rotation about one of the rotary shafts connected to the left and right wheels. A plurality of three-throw pinion members each of which includes first, second and third pinions, are provided therein for non-rotation relative to one another and are rotatably supported on the carrier member. A first sun gear is connected to the other rotary shaft which is connected to the other of the left and right wheels, a second sun gear is meshed with the second pinion and is connected to the one rotary shaft, and a third sun gear is meshed with the third pinion. A first clutch couples the third sun gear to a stationary member, and a second clutch couples the carrier member to the stationary member. The number of teeth of the first, second and third pinions and the first, second and third sun gears are set to substantially establish a relationship represented by the following expression between the gear ratio $R_1$ of the first pinion to the first sun gear, the gear ratio $R_2$ of the second pinion to the second sun gear and the gear ratio $R_3$ of the third pinion to the third sun gear:

$R_1 : R_2 : R_3 = 1.00 : 1.15 : 2.14$.

With the above feature, the rate of increase in speed from the one wheel to the other wheel and the rate of increase in speed from the other wheel to the one wheel can be equalized to each other with an extremely high accuracy, thereby enabling a reduction in cost by the common use of parts of the first and second clutches and the simplification of the driving system.

According to a third aspect and feature of the present invention, there is provided a driving force distributing system for a vehicle comprising a driving force distributing device to which the driving force of a laterally disposed engine is transmitted through a transmission and a differential and which is mounted to a side of the differential gearing assembly by movement of the device in a lateral direction of the vehicle body. The driving force distributing device includes a half shaft which extends in the lateral direction through the inside of the driving force distributing device and has one end inserted into and coupled to the differential. The half shaft is divided into two sections which can be coupled to each other between the driving force distributing device and the differential.

With the above arrangement, the driving force distributing device is only moved through a small distance for assembling. Therefore, during assembling of the driving force distributing device, the driving force distributing device does not interfere with the engine, leading to a substantially enhanced workability.

According to a fourth aspect and feature of the present invention, the driving force distributing device includes a carrier member supporting portion formed within the casing and a carrier member rotatably supported on the carrier member supporting portion. A pinion shaft is mounted on the carrier member, and pinions are rotatably carried on the pinion shaft. The casing has a rib projecting from an inner wall thereof, so that oil which is splashed circumferentially from the bottom of the casing by the carrier member in order to supply oil to the inner peripheral surfaces of the pinions through an oil bore in the pinion shaft, is permitted to collide against the rib. The carrier member support portion has an oil passage defined therein, for guiding the oil colliding against the rib to the oil bore in the pinion shaft.

With the above arrangement, the pinions can be effectively lubricated by a simple structure formed only by the provision of the rib and the oil passage. This can contribute to a reduction in number of parts, in cost and in size of the system.

According to a fifth aspect and feature of the present invention, the driving force distributing device includes a hydraulic pressure control device for selectively operating a first actuator and a second actuator by hydraulic pressure supplied from a hydraulic pressure source. The hydraulic pressure control device includes a regulator valve for regulating the hydraulic pressure supplied from the hydraulic pressure source, a first on-off valve interposed between the regulator valve and the first actuator, a second on-off valve interposed between the regulator valve and the second actuator, and a control means for controlling the operations of the regulator valve, the first on-off valve and the second on-off valve.

With the above arrangement, regulator valve which is expensive, is single, but it is possible to control the two actuators independently, thereby providing a reduction in cost.

According to a sixth aspect and feature of the present invention, the driving force distributing device includes a sun gear provided on a center shaft, a carrier member rotated about the center shaft, and a plurality of pinions rotatably carried on the carrier member and meshed with the sun gear. The sun gear is divided into an inner peripheral member carried directly on the center shaft, and an outer peripheral member meshed with the pinions in order to avoid the application of an uneven load to the meshed portions of the pinions and the sun gear. The inner and outer peripheral members are spline-coupled to each other, so that they can be rotated in unison with each other, while being permitted to be displaced relative to each other in a radial direction of the center shaft.

With the above arrangement, by radially displacing the outer peripheral member meshed with the pinions relative to the inner peripheral member carried directly on the center shaft, an uneven load can be prevented from being produced in the meshed portions of the sun gear and the pinions, thereby providing a reduction in noise and an enhancement in durability.

The above and other objects, features and advantages of the invention will become apparent from the following description of the preferred embodiment taken in conjunction with the accompanying drawings.

BRIEF DESCRIPTION OF THE DRAWINGS

FIG. 9 is a view for explaining the operation during assembling of a driving force distributing device.

DETAILED DESCRIPTION OF THE PREFERRED EMBODIMENT

The present invention will now be described by way of an embodiment with reference to the accompanying drawings.

Figure 1:
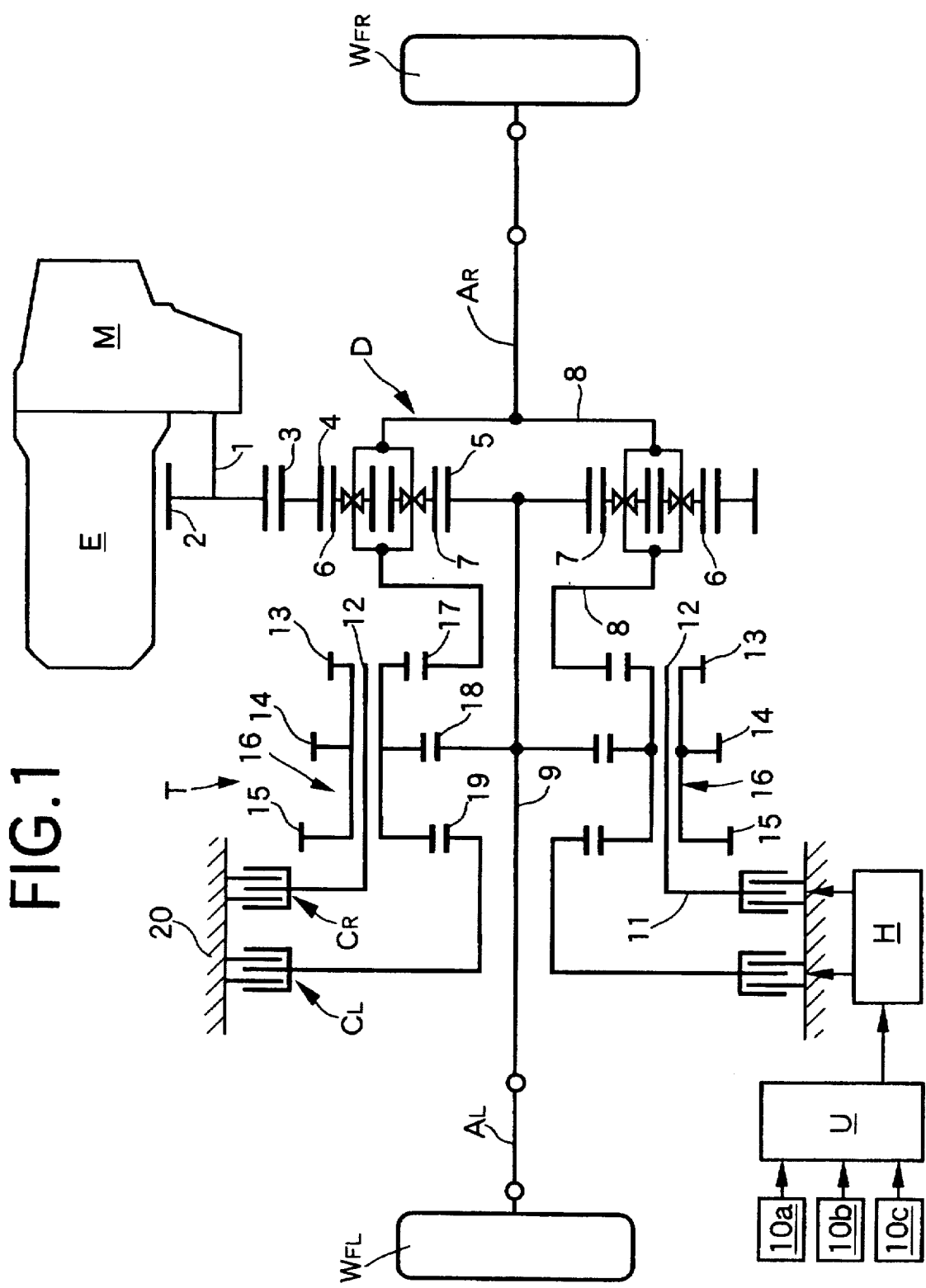
FIG. 1 is a schematic diagram illustrating a power transmitting system in a vehicle.

Referring to FIG. 1, a transmission M is connected to a right end of an engine E mounted laterally at a front portion of a vehicle body, and a driving force distributing device T is disposed to rear of the engine E and the transmission M. A left front wheel $W_{FL}$ and a right front wheel $W_{FR}$ which are driven wheels, are connected to a left drive shaft $A_L$ and a right drive shaft $A_R$ which extend leftwards and rightwards from left and right ends of the driving force distributing device T, respectively.

The driving force distributing device T is connected to a differential D to which a driving force is transmitted from an external-tooth gear 3 meshed with an input gear 2 which is provided on an input shaft 1 extending from the transmission M. The differential D comprises a double-pinion type planetary gear mechanism, and includes a ring gear 4 formed integrally with the external-tooth gear 3, a sun gear 5 coaxially disposed in the ring gear 4, and a planetary carrier 8 which carries outer planetary gears 6 meshed with the ring gear 4 and inner planetary gears 7 meshed with the sun gear 5 in a state in which they are meshed with each other. In the differential D, the ring gear 4 functions as an input element, and the sun gear 5 functioning as one of output elements, is connected to the left drive shaft $A_L$ through a half shaft 9, while the planetary carrier functioning as the other output element is connected to the right drive shaft $A_R$.

A carrier member 11 is rotatably supported around an outer periphery of the half shaft 9 and includes four pinion shafts 12 circumferentially disposed at distances of 90°. Three-throw pinion members 16 each having first, second and third pinions 13, 14 and 15 integrally formed thereon, are rotatably supported on pinion shafts 12. The number of the three-throw pinion members 16 is four in the embodiment shown, but it is not limited to four, and may be two or more.

A first sun gear 17, which is rotatably supported around the outer periphery of the half shaft 9 and meshed with the first pinion 13, is connected to the planetary carrier 8 of the differential D. A second sun gear 18, which is fixed to the outer periphery of the half shaft 9, is meshed with the second pinion 14. Further, a third sun gear 19, which is rotatably supported on the outer periphery of the half shaft 9, is meshed with the third pinion 15.

The number of teeth of each of the first pinion 13, the second pinion 14, the third pinion 15, the first sun gear 17, the second sun gear 18 and the third sun gear 19 is as follows:

Number of teeth of the first pinion 13 $P_1=16$
Number of teeth of the second pinion 14 $P_2=16$
Number of teeth of the third pinion 15 $P_3=32$
Number of teeth of the first sun gear 17 $S_1=30$
Number of teeth of the second sun gear 18 $S_2=26$
Number of teeth of the third sun gear 19 $S_3=28$ Therefore, if the gear ratio of the first pinion 13 to the first sun gear 17 meshed with each other, is represented by $R_1(P_1/S_1)$; the gear ratio of the second pinion 14 to the second sun gear 18 meshed with each other, is represented by $R_2(P_2/S_2)$; and the gear ratio of the third pinion 15 to the third sun gear 19 meshed with each other, is represented by $R_2(P_1/S_3)$, $R_1:R_2:R_3=16/30:16/26:32/28=1.00:1.15:2.14$.

The third sun gear 19 is capable of being coupled to a casing 20 through a left hydraulic clutch $C_L$, and the number of revolutions of the carrier member 11 is increased by engagement of the left hydraulic clutch $C_L$. The carrier member 11 is capable of being coupled to the casing 20 through a right hydraulic clutch $C_R$, and the number of revolutions of the carrier member 11 is decreased by engagement of the right hydraulic clutch $C_R$.

The left and right hydraulic clutches $C_L$ and $C_R$ are controlled through a hydraulic pressure circuit H by an electronic control unit U to which signals from a vehicle speed sensor 10a, a steering angle sensor 10b and a lateral acceleration sensor 10c are inputted.

Figure 2:
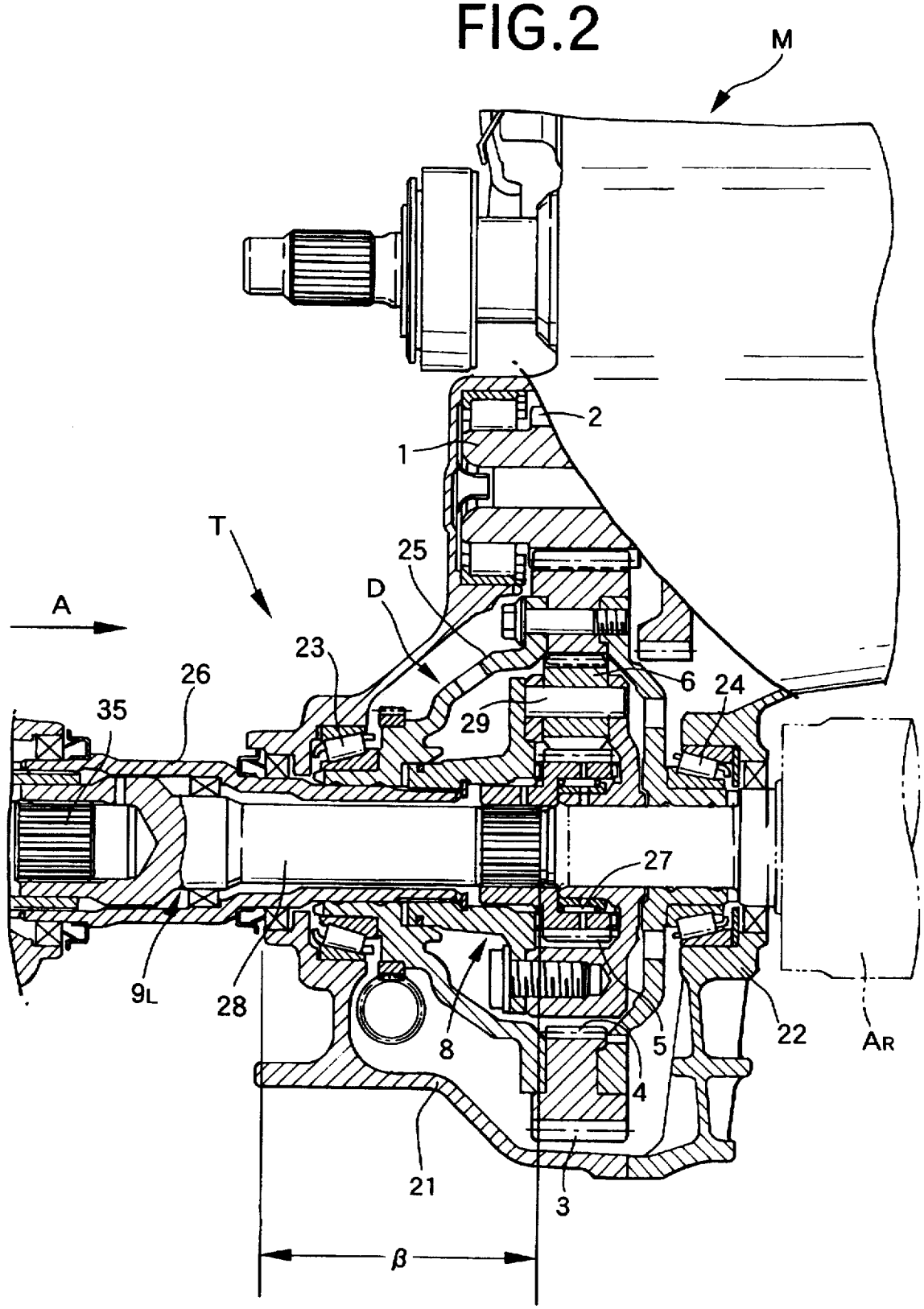
FIG. 2 is an enlarged view of a section indicated by 2 in FIG. 1.

The structure of the differential D will be further described with reference to FIG. 2.

The differential D is positioned within a left casing section 21 and a right casing section 22 which form the casing of the transmission M. A differential gear box 25 having the external-tooth gear 3 around an outer periphery thereof is rotatably supported on a roller bearing 23 mounted in the left casing section 21 and a roller bearing 24 mounted in the right casing section 22. The planetary carrier 8 is rotatably supported within the differential gear box 25. A first sleeve 26 spline-coupled to the center of a left side of the planetary carrier 8 extends leftwards through the differential gear box 25 and the left casing section 21, and a right drive shaft $A_R$ spline-coupled to the center of a right side of the planetary carrier 8 extends rightwards through the differential gear box 25 and the right casing section 22.

A right shaft half 28 of the half shaft 9 is divided into two portions and is spline-coupled to the center of the sun gear 5 which is rotatably supported at the center of the planetary carrier 8 through a needle bearing 27. The outer planetary gears 6 meshed with the ring gear 4 mounted in the differential gear box 25, and the inner planetary gears 7 meshed with the sun gear 5, (only the outer planetary gears 6 are shown in FIG. 2) are supported on a plurality of planetary gear shafts 29 mounted on the planetary carrier 8.

Figure 3:
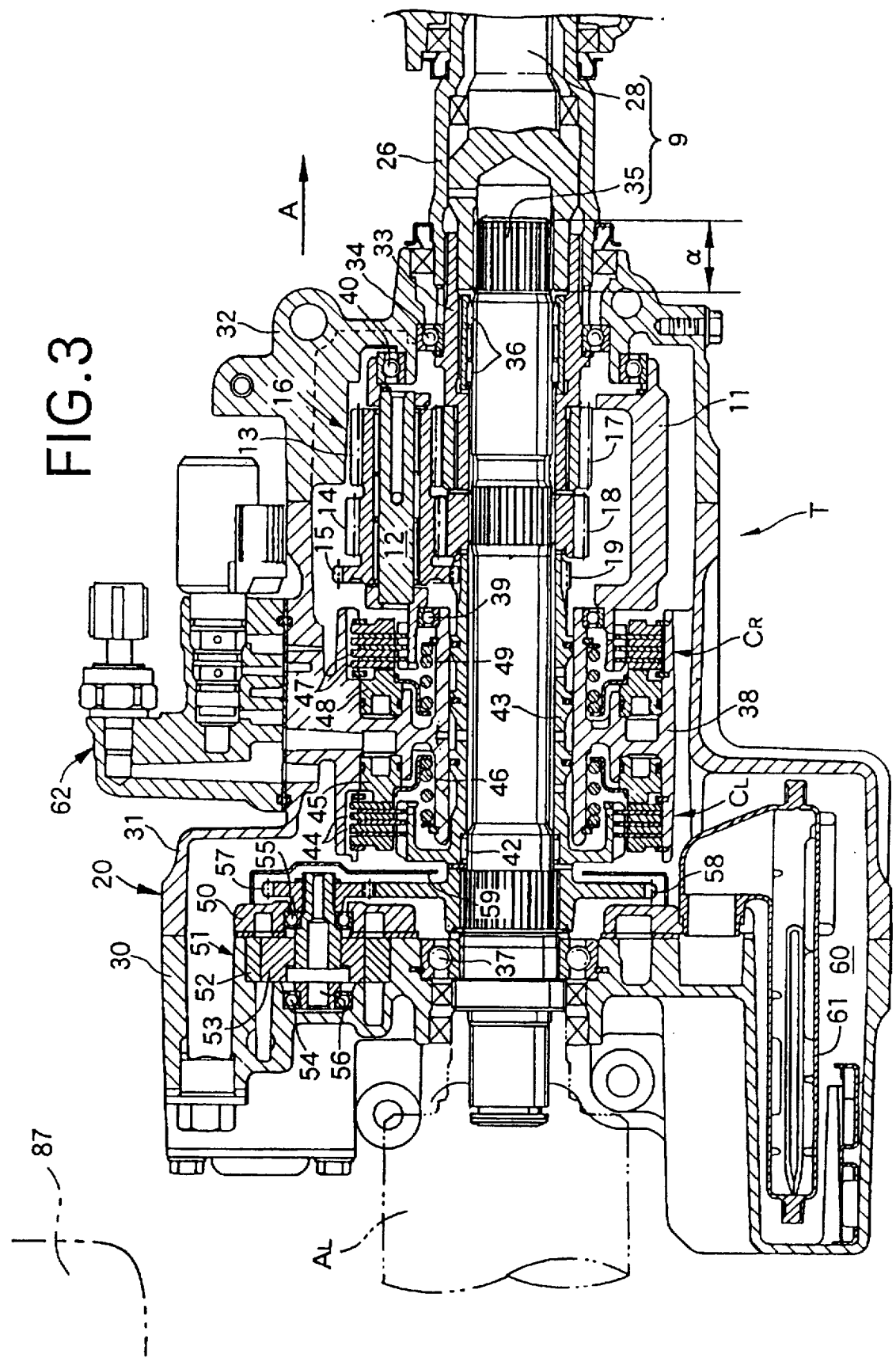
FIG. 3 is an enlarged view of a section indicated by 3 in FIG. 1.

The structure of the driving force distributing device T will be described with reference to FIG. 3.

The casing of the driving force distributing device T is divided into three sections: a left casing section 30, a central casing section 31 and a right casing section 32. A second sleeve 33 spline-coupled to a left end of the first sleeve 26, is supported on the right casing section 32 through a ball bearing 34, and a left shaft half 35 of the half shaft 9 is rotatably supported in the second sleeve 33 through needle bearings 36, 36. A sun gear body 63 is coupled to an outer periphery of a left end of the second sleeve 33 through a spline 64. The second sleeve 33 and the sun gear body 63 comprise the first sun gear 17. In the half shaft 9 accommodated in the first sleeve 26 and the second sleeve 33 spline-coupled to each other, an outer periphery of a right end of the left shaft half 35 is coaxially fitted and integrally spline-coupled to an inner periphery of a left end of the right shaft half 28. The left end of the left shaft half 35 of the half shaft 9 supported in the left casing section 30 through a ball bearing 37, extends outward from the left casing section 30 and is spline-coupled to the left drive shaft $A_L$.

As described above, the first sun gear 17 is divided into the two portions: the second sleeve 33 as an inner peripheral member. The sun gear body 63 as an outer peripheral member. The second sleeve 33 and the sun gear body 63 are coupled to each other for non-rotation relative to each other and with a radial slight looseness. Therefore, even if the second sleeve 33 is supported with no looseness on the left shaft half 35 through a pair of needle bearings 36, 36, the sun gear body 63 can be moved radially by an amount corresponding to the looseness of the spline 64 relative to the second sleeve 33. Thus, it is possible to prevent an uneven load when the plurality of first pinions 13 are meshed with the sun gear body 63 of the first sun gear 17, and to prevent the generation of a noise and provide an enhancement in durability.

The carrier member 11 is rotatably supported through a pair of ball bearings 39 and 40 on the right casing section 32 and a clutch housing 38 is integrally formed in the central casing section 31. The three-throw pinion members 16 each including the first, second and third pinions 13, 14 and 15 are supported the plurality of pinion shafts 12 mounted on the carrier member 11. The first pinion 13 is meshed with the first sun gear 17 which is spline-coupled to the outer periphery of the second sleeve 33. The second pinion 14 is meshed with the second sun gear 18 which is spline-coupled to the left shaft half 35 of the half shaft 9. The third pinion 15 is meshed with the third sleeve 43 which is rotatably supported on the outer periphery of the left shaft half 35, through the needle bearing 42.

The left hydraulic clutch $C_L$ includes a plurality of friction engage elements 44 disposed between the central casing 31 and the third sleeve 43, a piston 45 for bringing the friction engage elements 44 into engagement with one another by hydraulic pressure, and a return spring 46 for biasing the piston 45 in a disengaging direction. The right hydraulic clutch $C_R$ includes a plurality of friction engage elements 47 disposed between the central casing 31 and the carrier member 11, a piston 48 for bringing the friction engage elements 47 into engagement with one another by hydraulic pressure, and a return spring 49 for biasing the piston 48 in a disengaging direction.

A hydraulic pump 51 is provided in the left casing section 30 and covered with a pump cover 50. The hydraulic pump 51 comprises a trochoidal pump including an outer rotor 52 and an inner rotor 53. A pump shaft 56 is supported in the left casing section 30 and the pump housing 50 through ball bearings 54 and 55, and includes a pump follower gear 57 at an axial end protruding rightwards from the pump cover 50. The pump follower gear 57 is meshed with and driven by a pump driving gear 58 which is spline-coupled to the left shaft half 35 of the half shaft 9.

A gear cover 59 made from a pressed steel plate is mounted to a right surface of the pump cover 50, to cover the pump driving gear 58 and the pump follower gear 57. A lower portion of the pump driving gear 58 is immersed in an oil accumulated in a bottom of the casing 20. If an oil splash flies within the casing 20 with rotation of the pump driving gear 58, there is a possibility that the level of the oil may vary greatly, or the oil may leak through a breather passage. However, the flying of the oil can be reliably prevented by the mounting of the gear cover to eliminate the above problem. Since the gear cover is made from pressed steel plate, it is lightweight and inexpensive. Moreover, the attachment and detachment of the gear cover 59 is simple and hence, it is easy to change the material and the shape of the gear cover 59.

An oil reservoir 60 is defined in lower portions of the left and central casing sections 30 and 31, and the oil stored in the oil reservoir 60 is pumped by the hydraulic pump 51 through a strainer 61. A valve block 62 is mounted on an upper surface of the central casing section 31 for controlling the engagement/disengagement of the left and right hydraulic clutches CL and CR by the oil supplied from the pump 51.

As shown in FIG. 9, when the driving force distributing device T is assembled to the differential which is integral with the transmission T, it should first be noted that the half shaft 9 is formed of two seperate halves, the right shaft half 28 and the left shaft half 35. Prior to the assembly, the right shaft half 28 has been assembled to the differential D, and the left shaft half 35 has been assembled to the driving force distributing device T. The first and second sleeves 26 and 33 are also separated. The first sleeve 26 has been assembled to the differential D, and the second sleeve 33 has been assembled to the driving force distributing system T.

At the time of assembly, the driving force distributing device T having the left shaft half 35 and the second sleeve 33 is moved relative to the differential D, having the right shaft half 28 and the first sleeve 26, so that the outer periphery of the left shaft half 35 is spline-fitted to the inner periphery of the right shaft half 28, and the outer periphery of the second sleeve 33 is spline-fitted to the inner periphery of the first sleeve 26. At this time, the amount of movement a (see FIG. 3) of the driving force distributing device T in a direction of an arrow A suffices for spline-fitting the right shaft half 28 and the left shaft half 35. Therefore, the driving force distributing device T can be assembled to the differential D only by slightly moving the driving force distributing device T. Moreover, the spline-coupled portions of the left and right shaft halves 35 and 28 and the spline-coupled portions of the first and second sleeves 26 and 33 are located between the driving force distributing device T and the differential D and can be visually viewed. Hence, it is extremely easy to perform the coupling operation. Thus, the driving force distributing device T can be easily assembled to the differential D without interfering with an auxiliary 98 (see FIG. 3) of the engine E such as an oil filter or the like, located to the left of the driving force distributing device T.

If the half shaft 9 is a single member which is not divided into two sections, the amount of movement in the direction of the arrow A required for mounting of the driving force distributing device T, is equal to β (see FIG. 2) which is the amount of movement of the half shaft 9 into the differential D, and such movement amount is far larger than the movement amount α.

The structure of the hydraulic pressure circuit H will be described below with reference to FIGS. 4 and 5.

The oil pumped by the hydraulic pump 51 from the oil reservoir 60 through an oil passage $L_1$ is primarily regulated in a regulator valve 65 and then supplied to a linear solenoid valve 67 through an oil passage $L_2$ having an oil temperature sensor 66 incorporated therein, where the oil is secondarily regulated. An oil passage $L_3$ extending from the linear solenoid valve 67 is bifurcated in the middle into passage branches which are connected to left and right shift solenoid valves $68_L$ and $68_R$, respectively. The left shift solenoid valves $68_L$ is connected to the left hydraulic clutch $C_L$ through an oil passage $L_4$ having a left hydraulic pressure sensor $69_L$ incorporated therein, and the right shift solenoid valves $68_R$ is connected to the right hydraulic clutch $C_R$ through an oil passage $L_5$ having a right hydraulic pressure sensor $69_R$ incorporated therein. A lubricating oil passage $L_6$ extending from the regulator valve 65 communicates with the outer periphery of the half shaft 9 through the inside of the clutch housing 38.

The oil passages $L_1$ to $L_6$ for transmitting hydraulic pressure from the hydraulic pump 51 and passages connected to these oil passages are defined by the casing 20 of the driving force distributing device T and the valve block 62 coupled directly to the casing 20.

Figure 4:
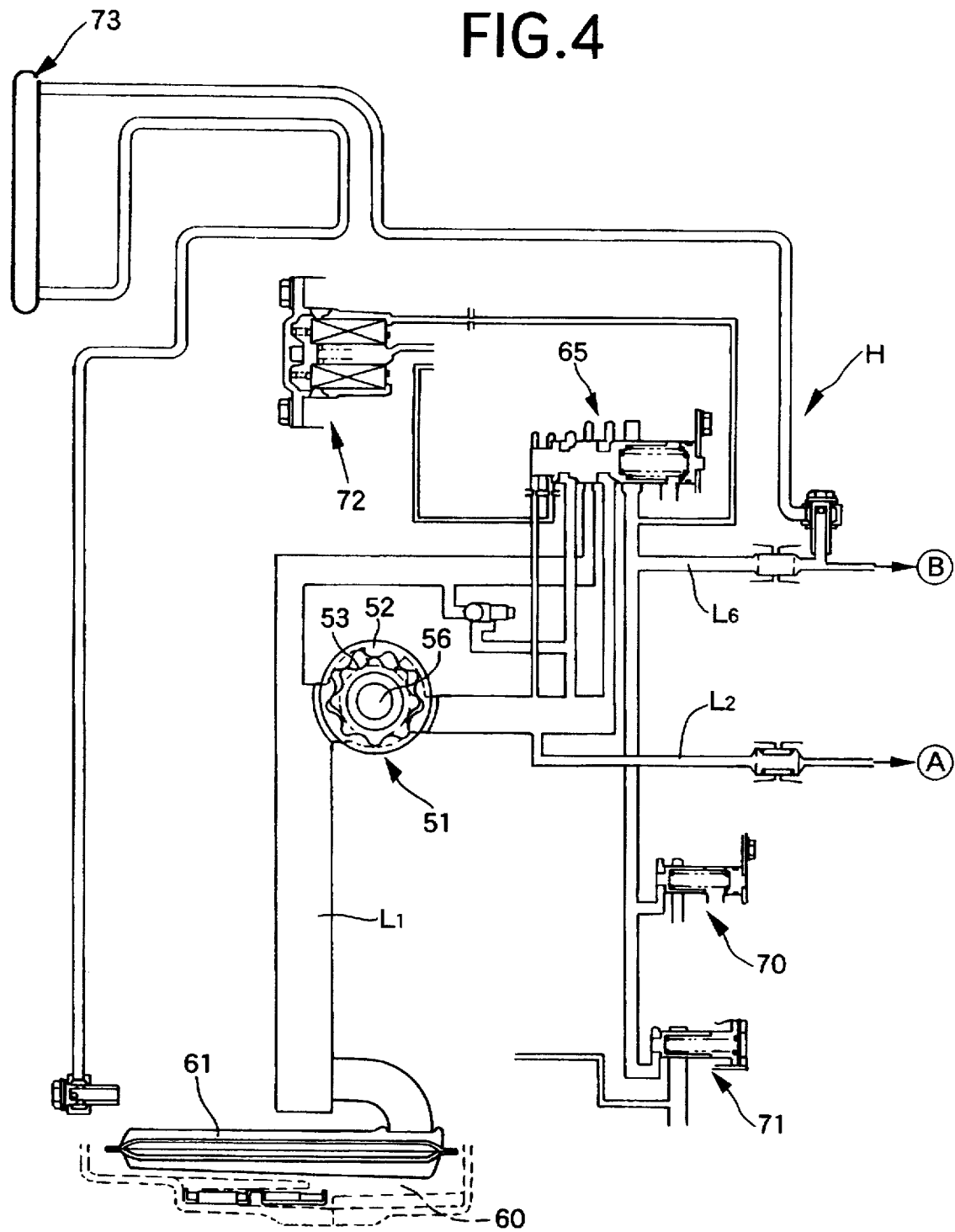
FIG. 4 is a first portion of a hydraulic pressure circuit.
Figure 5:
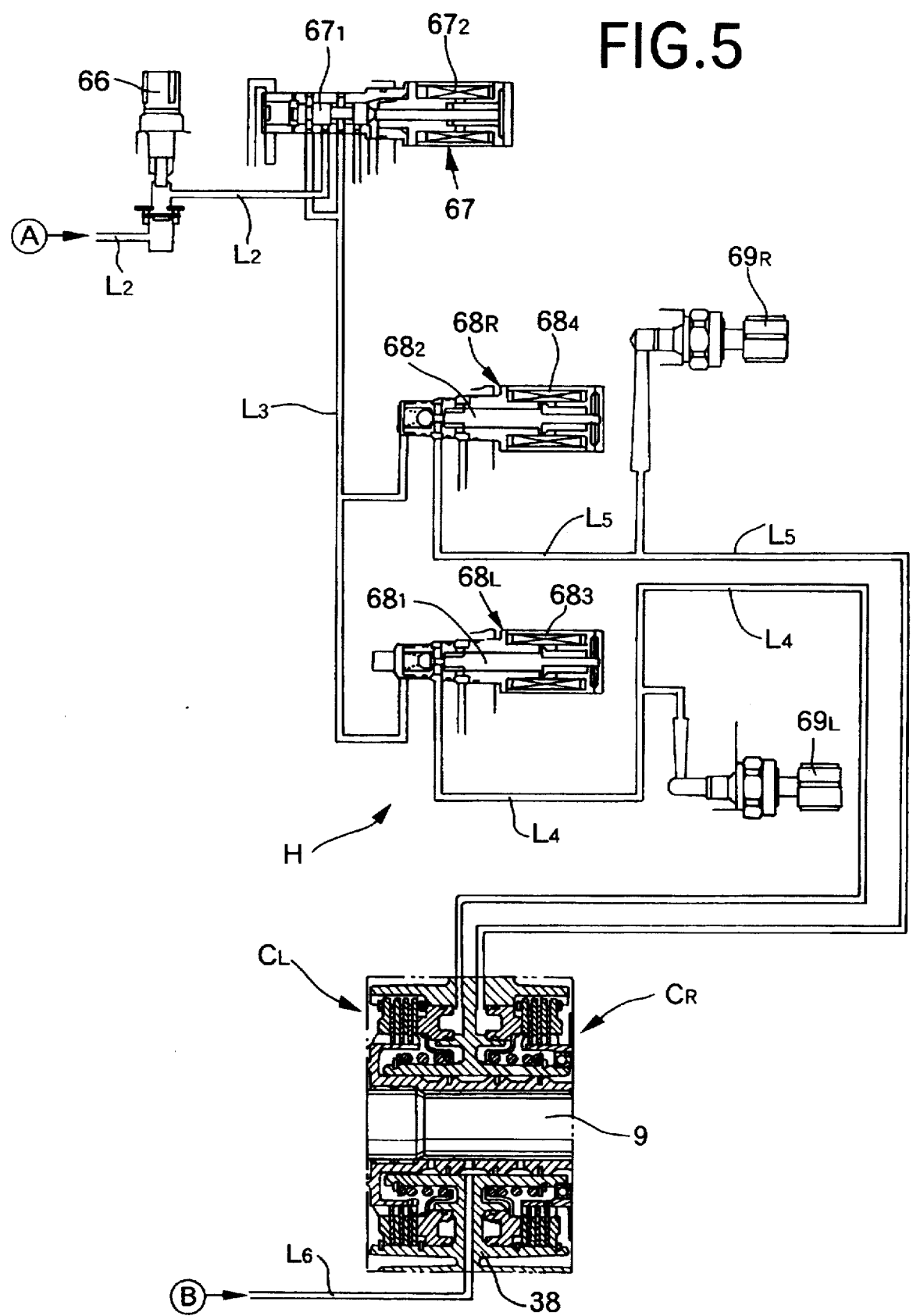
FIG. 5 is a second portion of the hydraulic pressure circuit.

In FIG. 4, reference character 70 is a cooler relief valve; reference character 71 is a lubricating/cooler relief valve; reference character 72 is a drain filter; and reference character 73 is a radiator built-in cold water cooler.

The linear solenoid valve 67, the left shift solenoid valve $68_L$ and the right shift solenoid valve $68_R$ are connected to and controlled by the electronic control unit U. The linear solenoid valve 67 secondarily regulates the hydraulic pressure primarily regulated in the regulator valve 65 to regulate the engagement forces of the left and right hydraulic clutches $C_L$ and $C_R$ to any value. The left shift solenoid valve $68_L$ is controlled between ON and OFF to open and close the oil passage $L_4$ and to control the engagement/disengagement of the left hydraulic clutch $C_L$. The right shift solenoid valve $68_R$ is controlled between ON and OFF to open and close the oil passage $L_5$ and to control the engagement/disengagement of the right hydraulic clutch $C_R$.

All of the linear solenoid valve 67, the left shift solenoid valve $68_L$ and the right shift solenoid valve $68_R$ are normally-closed valves. If the energization is cut off by a command from the electronic control unit U, the output hydraulic pressure from the linear solenoid valve 67 becomes zero, and the left and right solenoid valves $68_L$ and $68_R$ are closed to permit the left and right hydraulic clutches $C_L$ and $C_R$ to be put out of communication with the linear solenoid valve 67 and into the communication with the oil reservoir 60.

When the left and right solenoid valves $68_L$ and $68_R$ are opened from their closed states into their opened states, the output hydraulic pressure from the linear solenoid valve 67 is controlled, so that it is gradually increased from a hydraulic pressure near zero to a predetermined hydraulic pressure. Thus, a shock is prevented from being generated by the sudden engagement of the left hydraulic clutch $C_L$ or the right hydraulic clutch $C_R$.

Since the hydraulic pump 51 is disposed within the casing 20 of the driving force distributing device T, as described above, the oil passages $L_1$ to $L_6$ extending from the hydraulic pump 51 and connected to the left and right hydraulic clutches $C_L$ and $C_R$, and the accompanying oil passages can be defined in the casing 20 and the valve block 62 coupled directly to the casing 20. Thus, it is possible to minimize the length of each of the oil passages and moreover to eliminate the need for a pipe extending to the outside of the casing 20. If the hydraulic pump 51 is mounted on the engine E or the transmission M, not only is the length of the oil passages increased, but also it is necessary to place a pipe outside the casing. Moreover, it is difficult to cope with a situation where the type of oil used in the driving force distributing device T and the type of an oil used in the engine E or the transmission M are different from each other. In addition, the oil pump 51 is driven by the half shaft 9 connected to one of the wheels (the left front wheel in the embodiment) and hence, the driving system for transmitting the driving force to the hydraulic pump 51 can be simplified.

A lubricating system for the driving force distributing device T will be described with reference to FIGS. 6 to 8.

Figure 6:
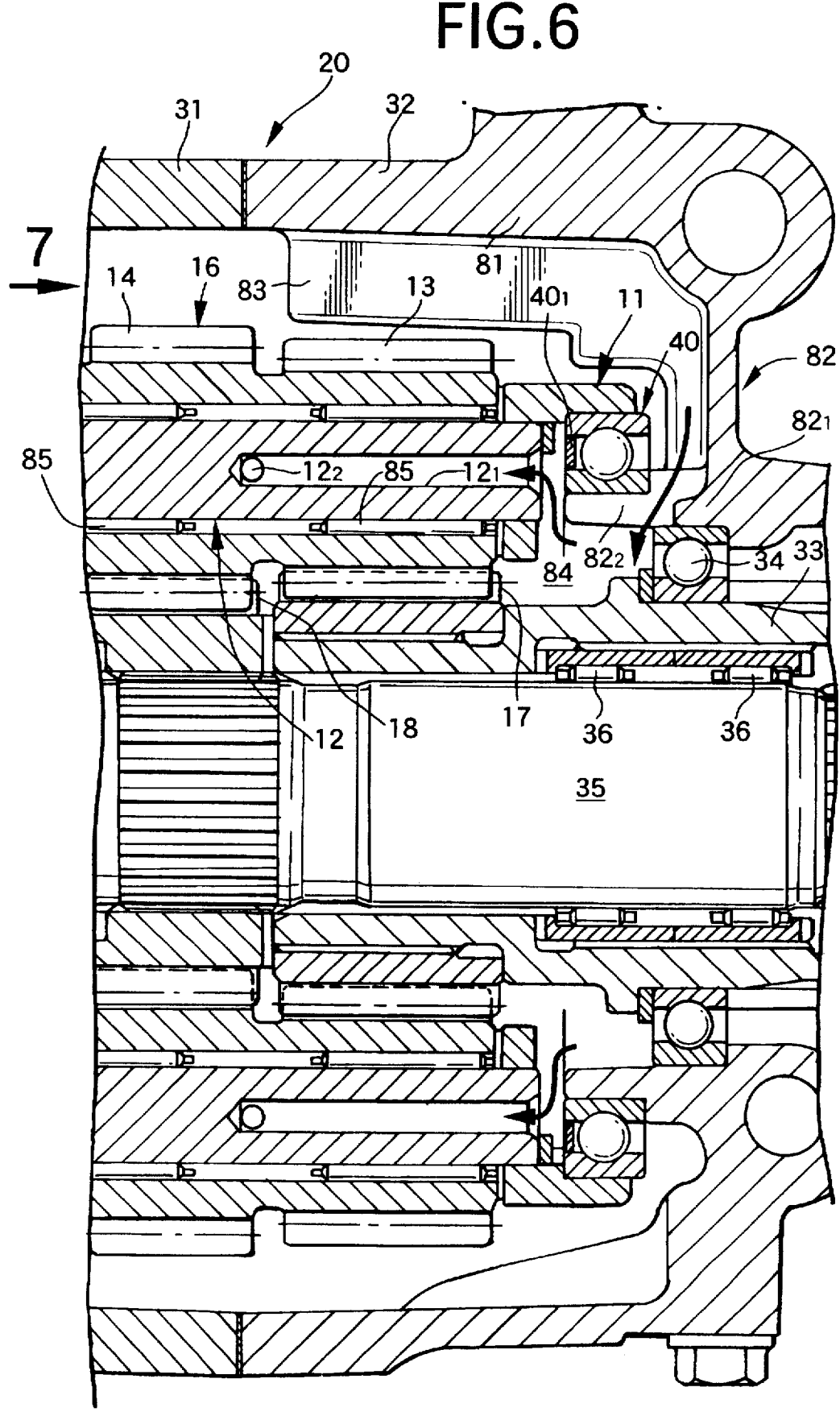
FIG. 6 is an enlarged view of an essential portion shown in FIG. 3.
Figure 7:
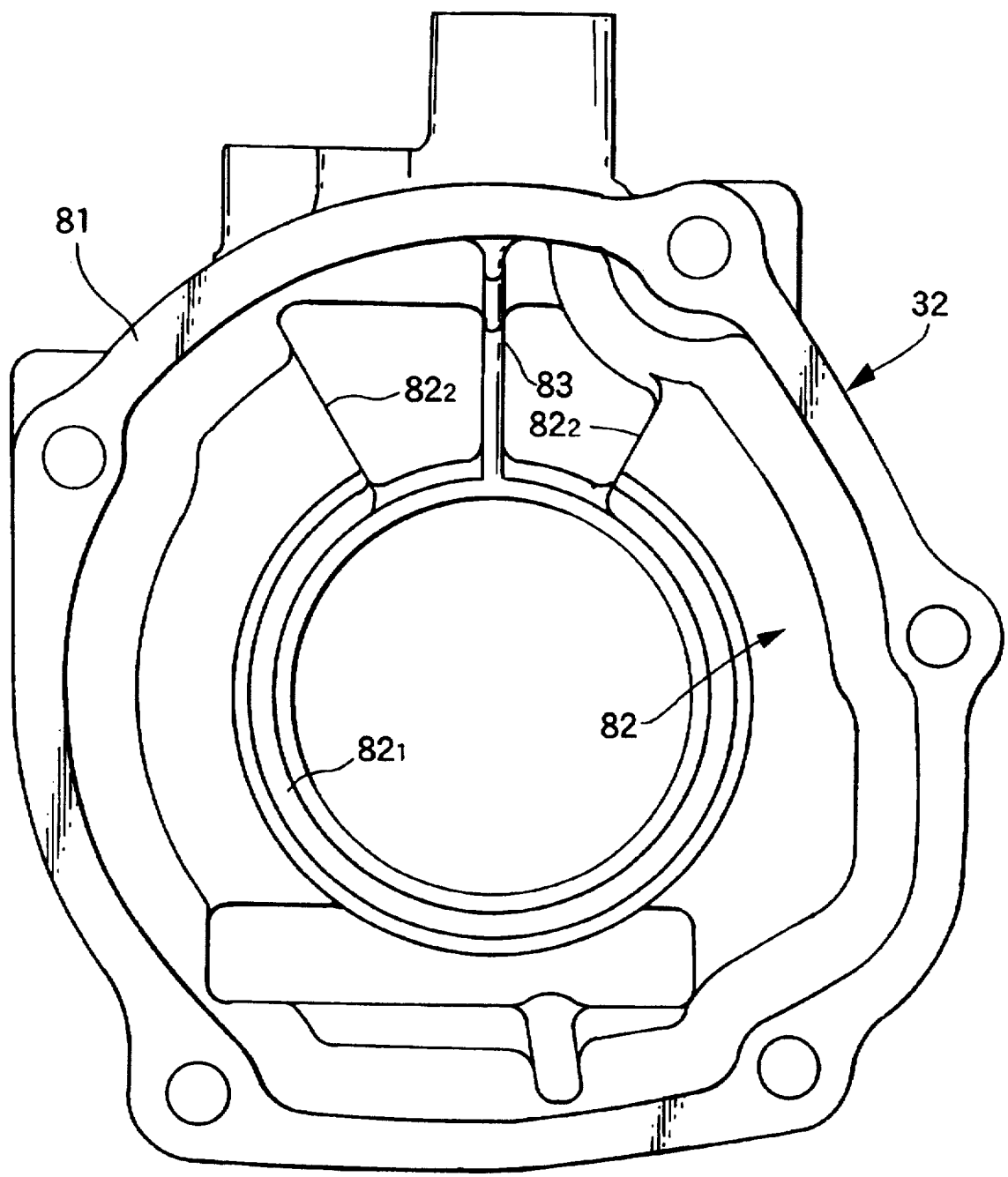
FIG. 7 is a view taken along an arrow 7 in FIG. 6.

As shown in FIGS. 6 and 7, the right casing section 32 includes a substantially cylindrical peripheral wall 81, and an end wall 82 connected to a radially inner side of a right end of the peripheral wall 81. The second sleeve 33 is supported on an inner periphery of the end wall 82 through the ball bearing 34. A short cylindrical carrier member supporting portion 82, is integrally provided to protrude axially leftwards from the end wall 82, radially outwards of the ball bearing 34, and the carrier member 11 is supported on an outer periphery of the carrier member supporting portion $82_1$ through the ball bearing 40. A rib 83 extending radially of the carrier member 11 is integrally provided from an upper portion of the peripheral wall 81 to the support portion $82_1$ of the end wall 82. The rib 83 extends downward to a location adjacent the outer periphery of the first pinion 13 of the three-throw pinion member 16 supported on the carrier member 11 through the pinion shaft 12.

Oil passages $82_2$, $82_2$ are defined in the carrier member support portion $82_1$ adjacent the opposite sides of the rib 83 to extend radially through the carrier member support portion $82_1$. On the other hand, an axially extending oil bore $12_1$ is provided in a right half of the pinion shaft 12 and opens at its right end into a space 84 between the second sleeve 33 and the support portion $82_1$. A left end of the oil bore $12_1$ communicates, through a radially extending oil bore $12_2$, with the outer periphery of the pinion shaft 12 on which the three-throw pinion member 16 is supported through a pair of needle bearings 85, 85. A seal $40_1$ is mounted on the ball bearing facing the space 84, to prevent the oil from leaking axially.

Figure 8:
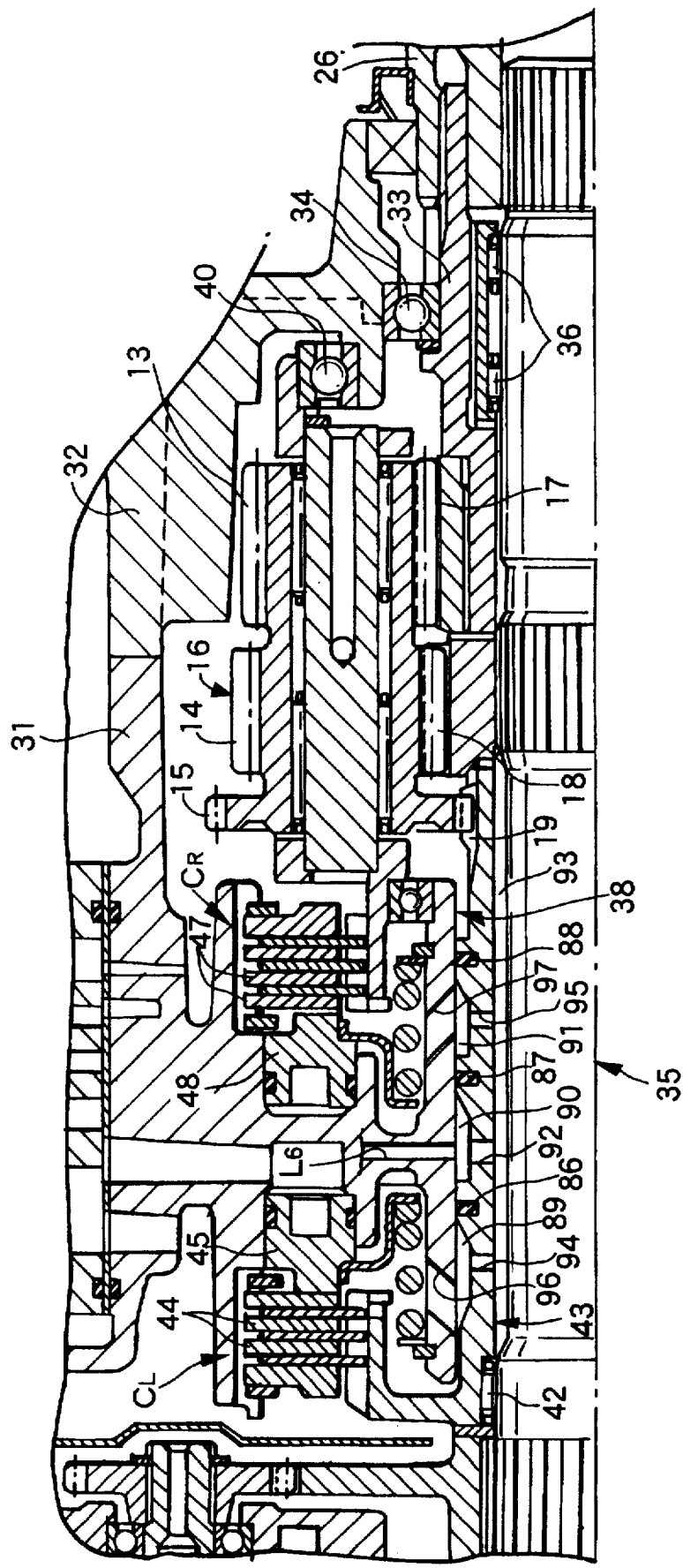
FIG. 8 is an enlarged view of an essential portion shown in FIG. 3.

As shown in FIG. 8, three O-rings 86, 87 and 88 are mounted on the outer periphery of the third sleeve 43 fitted over the outer periphery of the left shaft half 35, for sealing between the outer periphery of the third sleeve 43 and the inner periphery of the clutch housing 38. Three lubricating oil chambers 89, 90 and 91 are defined between the third sleeve 43 and the clutch housing 38, by the O-rings 86, 87 and 88. The central oil chamber 90 is connected to the hydraulic pump 51 through the oil passage $L_6$ defined in the clutch housing 38, and communicates with an annular oil passage 93 defined between the left shaft half 35 and the third sleeve 43, through an oil passage 92 radially passing through the third sleeve 43. The annular oil passage 93 is connected to the lubricating oil chambers 89 and 91, through a pair of oil passages 94 and 95 radially passing through the third sleeve 43. The lubricating oil chambers 89 and 91 communicate with the insides of the left and right hydraulic clutches $C_L$ and $C_R$ through oil passages 96 and 97 defined in the clutch housing 38, respectively.

The operation of the embodiment of the present invention having the above-described arrangement will be described below.

When the vehicle is traveling straight, both of the left and right hydraulic clutches $C_L$ and $C_R$ are brought into their non-engaged states. Thus, the restraint of the carrier member 11 and the third sun gear 19 is released, so that all of the half shaft 9, the left drive shaft $A_L$, the right drive shaft $A_R$, the planetary carrier 8 and the carrier member 11 of the differential D are rotated in unison with one another. At this time, the torque of the engine E is transmitted through the differential D equally to the left and right front wheels $W_{FL}$ and $W_{FR}$.

Now, during rightward turning of the vehicle, the right hydraulic clutch $C_R$ is brought into its engaged state through the electronic control unit U and the hydraulic pressure circuit H, thereby coupling the carrier member 11 to the casing 20 to stop the carrier member 11. At this time, the half shaft 9 and the left drive shaft $A_L$ rotated in unison with the left front wheel and the right drive shaft $A_R$ rotated in unison with the right front wheel $W_{FR}$ (i.e., the planetary carrier 8 of the differential D), are interconnected through the second sun gear 18, the second pinion 14, the first pinion 13 and the first sun gear 17. Therefore, the number $N_L$ of revolutions of the left front wheel $W_{FL}$ is increased in a relation to the number $N_R$ of revolutions of the right front wheel $W_{FR}$, which is represented by the following equation:

$$N_L/N_R=(S_1/P_1)(S_2/P_2)=1.1538 \quad (1)$$

If the number $N_L$ of revolutions of the left front wheel $W_{FL}$ is increased relative to the number $N_R$ of revolutions of the right front wheel $W_{FR}$ in the above manner, a portion of the torque of the right front wheel $W_{FR}$ which is an inner wheel during turning of the vehicle, can be transmitted to the left front wheel $W_{FL}$ which is an outer wheel during turning of the vehicle.

If the engagement force of the right hydraulic clutch $C_R$ is properly regulated to reduce the number of revolutions of the carrier member 11 in place of stopping the carrier member 11 by the right hydraulic clutch $C_R$, the number $N_L$ of revolutions of the left front wheel $W_{FL}$ can be increased relative to the number $N_R$ of the right front wheel $W_{FR}$ in response to the reduction of the number of revolutions of the carrier member 11, to transmit any torque from the right front wheel $W_{FR}$ which is the inner wheel during turning of the vehicle to the left front wheel $W_{FL}$ which is the outer wheel during turning of the vehicle.

On the other hand, during leftward turning of the vehicle, the left hydraulic clutch $C_L$ is brought into its engaged state through the electronic unit U and the hydraulic pressure circuit H, thereby permitting the third pinion 15 to be coupled to the casing 20 through the third sun gear 19. As a result, the number of revolutions of the carrier member 11 is increased relative to the number of revolutions of the half shaft 9, and the number $N_R$ of revolutions of the right front wheel $W_{FR}$ is increased in a relationship to the number $N_L$ of revolutions of the left front wheel $W_{FL}$, which is represented by the following equation:

$$N_R/N_L=(S_3/P_3-S_1/P_1)/(S_3/P_3-S_2/P_2)=1.1555 \quad (2)$$

If the number $N_R$ of revolutions of the right front wheel $W_{FR}$ is increased relative to the number $N_L$ of revolutions of the left front wheel $W_{FL}$ in the above manner, a portion of the torque of the left front wheel $W_{FL}$ which is the inner wheel during turning of the vehicle, can be transmitted to the right front wheel $W_{FR}$ which is the outer wheel during turning of the vehicle. Even in this case, if the engagement force of the left hydraulic clutch $C_L$ is properly regulated to increase the number of revolutions of the carrier member 11, the number $N_R$ of revolutions of the right front wheel $W_{FR}$ can be increased relative to the number $N_L$ of revolutions of the left front wheel $W_{FL}$, in accordance with the increasing of the number $N_R$ of revolutions of the right front wheel $W_{FR}$, whereby any torque can be transmitted from the left front wheel $W_{FL}$ which is the inner wheel during turning of the vehicle, to the right front wheel $W_{FR}$ which is the outer wheel during turning of the vehicle.

As is apparent from the comparison of the equations (1) and (2) with each other, by setting the number of teeth of the first, second and third pinions 13, 14 and 15 and the first, second and third sun gears 17, 18 and 19 at the above-described values, the ratio (about 1.1538) of increase in speed from the right $W_{FR}$ to the left front wheel $W_{FL}$ and the ratio (about 1.1555) of increase in speed from the left front wheel $W_{FL}$ to the right front wheel $W_{FR}$ can be substantially equalized to each other, and the difference between both of the ratios can be limited to no more than 0.15%. Thus, the distribution of the driving force to the left and right front wheels $W_{FL}$ and $W_{FR}$ can be performed laterally symmetrically without special provision of a difference between the driving force transmitting capacities of the left and right hydraulic clutches $C_L$ and $C_R$, or between the hydraulic pressure supplied to the left and right hydraulic clutches $C_L$ and $C_R$, thereby bringing about a reduction in cost by the common use of parts of the left and right hydraulic clutches $C_L$ and $C_R$, and by the simplification of the driving system.

Although the embodiment of the present invention has been described in detail, it will be understood that the present invention is not limited to the above-described embodiment, and various modifications may be made without departing from the spirit and scope of the invention defined in claims.

What is claimed is:

1. A driving distributing system for a vehicle having an engine, and left and right wheels, said system including a driving force distributing device for distributing a driving force of the engine to said left and right wheels, said distributing device having a casing therearound; a hydraulic clutch, said hydraulic clutch being controlled by said driving force distributing device; a hydraulic pump for producing a hydraulic pressure in said hydraulic clutch; a first rotary shaft connecting said pump to one of said right and left wheels; and a second rotary shaft connected to the other of said right and left wheels; wherein said hydraulic pump is disposed within said casing of said driving force distributing device and driven by rotation of said first rotary shaft.

2. A driving force distributing system for a vehicle according to claim 1, including a gear cover, and gears interconnecting said first rotary shaft and said hydraulic pump, wherein said hydraulic pump and gears are within said casing and are covered by said gear cover.

3. A driving force distributing system for a vehicle according to claim 1, wherein said driving force distributing device comprises a carrier member supported for rotation about said rotary shaft, a plurality of three-throw pinion members each said pinion member including first, second and third pinions provided therein for non-rotation relative to one another and rotatably supported on said carrier member, a first sun gear connected to said second rotary shaft, a second sun gear meshed with said second pinion and connected to said first rotary shaft, a third sun gear meshed with said third pinion, a first clutch for coupling said third sun gear to a stationary member, and a second clutch for coupling said carrier member to said stationary member, wherein the number of teeth of said first, second and third pinions and said first, second and third sun gears are set to substantially establish a relationship between the gear ratio $R_1$ of said first pinion to said first sun gear, the gear ratio $R_2$ of said second pinion to said second sun gear and the gear ratio $R_3$ of said third pinion to said third sun gear where:

$$R_1:R_2:R_3=1.00:1.15:2.14.$$

4. A driving force distributing system for a vehicle according to claim 3, wherein the number of teeth of said first pinion is 16; the number of teeth of said second pinion is 16; the number of teeth of said third pinion is 32; the number of teeth of said first sun gear is 30; the number of teeth of said second sun gear is 26; and the number of teeth of said third sun gear is 28.

5. A driving force distributing system for a vehicle according to claim 1, wherein the vehicle includes a transmission and a differential, the engine is laterally disposed with respect to a direction of the vehicle, and said distributing device is mounted to a side of said differential, wherein the driving force to said driving force distributing device is transmitted through said transmission and said differential, wherein said driving force distributing device includes a half shaft extending in the lateral direction with respect to the direction of the vehicle through the inside of said driving force distributing device and has one end inserted into and coupled to said differential, said half shaft being divided into two sections coupled to each other between said driving force distributing device and said differential.

6. A driving force distributing system for a vehicle according to claim 5, wherein said half shaft sections are spline-coupled to each other, a length for the spline-coupling being smaller than the amount of said half shaft inserted into said differential.

7. A driving force distributing system for a vehicle according to claim 1, wherein said driving force distributing device includes a carrier member supporting portion within said casing, a carrier member rotatably supported on said carrier member supporting portion, a pinion shaft mounted on said carrier member, and pinions rotatably carried on said pinion shaft, and wherein said casing has a rib projecting from an inner wall thereof, such that oil splashed circumferentially from a bottom of said casing by said carrier member for supply to the inner peripheral surfaces of said pinions through an oil bore in said pinion shaft, collides with said rib, said carrier member support portion having an oil passage defined therein for guiding the oil colliding with said rib, to said oil bore in said pinion shaft.

8. A driving force distributing system for a vehicle according to claim 1, including a first actuator, a second actuator, and a hydraulic pressure source, wherein said driving force distributing device includes a hydraulic pressure control device for selectively operating said first actuator and said second actuator by hydraulic pressure supplied from said hydraulic pressure source, said hydraulic pressure control device including a regulator valve for regulating the hydraulic pressure supplied from said hydraulic pressure source, a first on-off valve coupled between said regulator valve and said first actuator, a second on-off valve coupled between said regulator valve and said second actuator, and a control means for controlling the operations of said regulator valve, said first on-off valve and said second on-off valve.

9. A driving force distributing system for a vehicle according to claim 8, wherein each of said regulator valve, said first on-off valve and said second on-off valve is a normally-closed solenoid valve, and wherein said control means cuts off the current to said regulator valve, said first on-off valve and said second on-off valve in the event of misoperation.

10. A driving force distributing system for a vehicle according to claim 9, wherein each of said first and second actuators is a hydraulic clutch in said driving force distributing device.

11. A driving force distributing system for a vehicle according to claim 8, wherein when said first or second on-off valve is opened, the output hydraulic pressure from said regulator valve is gradually increased from near zero to a predetermined value.

12. A driving force distributing system for a vehicle according to claim 1, wherein said driving force distributing device includes a sun gear on a center shaft, a carrier member rotated about said center shaft, and a plurality of pinions rotatably carried on said carrier member and meshed with said sun gear, said sun gear being divided into an inner peripheral member carried directly on said center shaft, and an outer peripheral member meshed with said pinions for preventing the application of an uneven load to meshed portions of said pinions and said sun gear, said inner and outer peripheral members being spline-coupled to each other, for rotation in unison with each other, while being permitted to be displaced relative to each other in a radial direction of said center shaft.

13. A driving force distributing system for a vehicle according to claim 1, wherein said pump has a pump shaft which is connected to said first rotary shaft via a gear arrangement.

14. A driving force distributing system for a vehicle according to claim 13, wherein said pump comprises a trochoidal pump.

* * * * *